US011611951B2

(12) United States Patent
Kodaypak et al.

(10) Patent No.: US 11,611,951 B2
(45) Date of Patent: Mar. 21, 2023

(54) DEVICE CONTEXTS, OPERATIONAL MODES, AND POLICY DRIVEN ENHANCEMENTS FOR PAGING IN ADVANCED NETWORKS

(71) Applicant: AT&T Intellectual Property I, L.P., Atlanta, GA (US)

(72) Inventors: Rajendra Prasad Kodaypak, Sammamish, WA (US); Ryan Redfern, Cerritos, CA (US); Jiansong Wang, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 12 days.

(21) Appl. No.: 17/470,204

(22) Filed: Sep. 9, 2021

(65) Prior Publication Data

US 2021/0410109 A1   Dec. 30, 2021

Related U.S. Application Data

(63) Continuation of application No. 16/286,964, filed on Feb. 27, 2019, now Pat. No. 11,147,041.

(51) Int. Cl.
*H04W 68/04* (2009.01)
*H04W 68/02* (2009.01)
(Continued)

(52) U.S. Cl.
CPC ....... *H04W 68/04* (2013.01); *H04W 28/0226* (2013.01); *H04W 64/006* (2013.01); *H04W 68/02* (2013.01); *H04W 68/06* (2013.01)

(58) Field of Classification Search
CPC .............................. H04W 36/02; H04W 40/36
See application file for complete search history.

(56) References Cited

U.S. PATENT DOCUMENTS

| 6,223,045 B1* | 4/2001 | Valentine | ........... H04B 7/18567 |
| | | | 455/412.1 |
| 6,594,493 B1* | 7/2003 | Davies | ................. H04W 68/04 |
| | | | 455/436 |

(Continued)

FOREIGN PATENT DOCUMENTS

| WO | 2017/158440 A1 | 9/2017 |
| WO | 2018/026139 A1 | 2/2018 |

(Continued)

OTHER PUBLICATIONS

Non-Final Office Action received for U.S. Appl. No. 16/286,964 dated Jul. 6, 2020, 24 pages.

(Continued)

*Primary Examiner* — Joshua L Schwartz
(74) *Attorney, Agent, or Firm* — Amin, Turocy & Watson, LLP

(57) ABSTRACT

Facilitating device contexts, operational modes, and policy driven enhancements for paging in advanced networks (e.g., 4G, 5G, 6G, and beyond) is provided herein. Operations of a network device can comprise analyzing a group of contextual data for a user equipment device, and mobility management behaviors historically implemented for the user equipment device and based on an indication that a page request is scheduled to be sent to the user equipment device. The operations can also comprise configuring a paging message for the user equipment device based on the contextual data and the mobility management behaviors. Further, the operations can comprise sending the paging message to the user equipment device.

20 Claims, 10 Drawing Sheets

(51) Int. Cl.
*H04W 68/06* (2009.01)
*H04W 64/00* (2009.01)
*H04W 28/02* (2009.01)

(56) References Cited

U.S. PATENT DOCUMENTS

| | | |
|---|---|---|
| 9,788,300 B2 | 10/2017 | Zhang et al. |
| 10,123,365 B2 | 11/2018 | Baek et al. |
| 2017/0367069 A1 | 12/2017 | Agiwal et al. |
| 2018/0020432 A1 | 1/2018 | Rico Alvarino et al. |
| 2018/0192271 A1 | 7/2018 | Kim et al. |
| 2018/0198867 A1* | 7/2018 | Dao ................. H04W 76/34 |
| 2018/0263013 A1 | 9/2018 | Jain et al. |
| 2018/0331875 A1 | 11/2018 | Abedini et al. |
| 2018/0332562 A1 | 11/2018 | Selvaganapathy et al. |

FOREIGN PATENT DOCUMENTS

| | | |
|---|---|---|
| WO | 2018/030859 A1 | 2/2018 |
| WO | 2018/045307 A1 | 3/2018 |
| WO | 2018/062977 A1 | 4/2018 |
| WO | 2018/064358 A1 | 4/2018 |
| WO | 2018/142306 A1 | 8/2018 |
| WO | 2018/174579 A1 | 9/2018 |
| WO | 2018/175760 A1 | 9/2018 |
| WO | 2018/204703 A1 | 11/2018 |

OTHER PUBLICATIONS

Final Office Action received for U.S. Appl. No. 16/286,964 dated Feb. 19, 2021, 21 pages.

* cited by examiner

DEVICE CONTEXTS, OPERATIONAL MODES, AND POLICY DRIVEN ENHANCEMENTS FOR PAGING IN ADVANCED NETWORKS

RELATED APPLICATION

The subject patent application is a continuation of, and claims priority to, U.S. patent application Ser. No. 16/286,964, filed Feb. 27, 2019, and entitled "DEVICE CONTEXTS, OPERATIONAL MODES, AND POLICY DRIVEN ENHANCEMENTS FOR PAGING IN ADVANCED NETWORKS," the entirety of which application is hereby expressly incorporated by reference herein.

TECHNICAL FIELD

This disclosure relates generally to the field of wireless communication and, more specifically, to Internet of Things (IoT) paging services in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
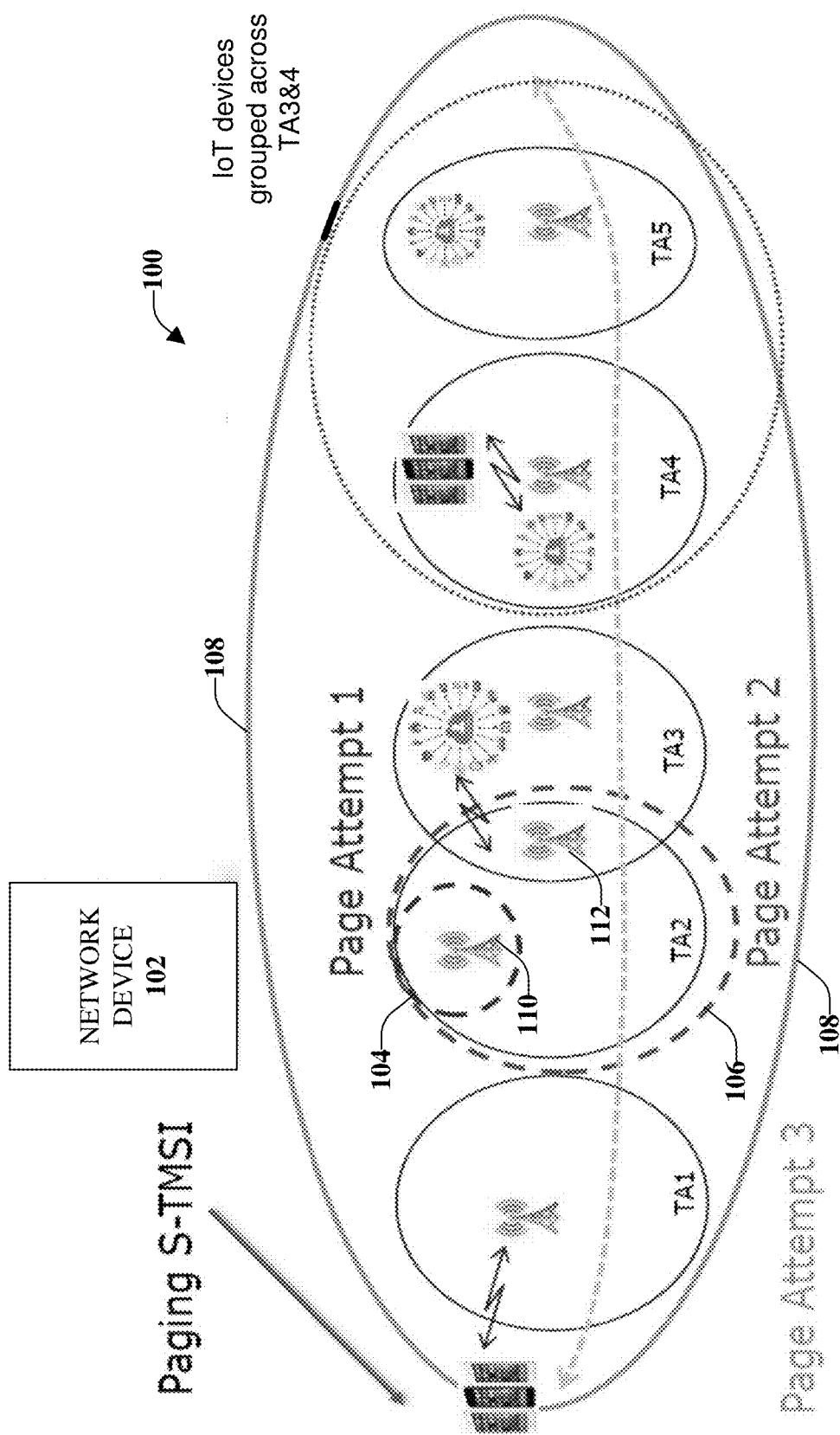
FIG. 1 illustrates an example, non-limiting, pictorial representation of paging attempts in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate device contexts, operational modes, and policy driven enhancements for paging in advanced networks. The various aspects can facilitate implementation of a paging workflow in a network device (e.g., a Mobility Management Entity (MME)). The workflow can consider a composite view of respective contextual data of one or more Internet of Things (IoT) devices and/or other devices. The workflow can also consider respective historical mobility management behaviors when a new page has been sent to wake up the one or more IoT devices and/or other devices. The workflow can comprise continuous real time (or near real time) updates of a mapping function based on signaling interactions with the RAN (eNB) and EPC (e.g., Serving Gateway (SGW), Home Subscriber Subsystem (HSS)) core network functions. Details related to this will be provided in further detail below.

In one embodiment, described herein is a method that can comprise evaluating, by a network device of a group of network devices, the network device comprising a processor, a composite view of contextual data associated with a user equipment device. The paging attempt can be scheduled for the user equipment device. The method can also comprise evaluating, by the network device, historical mobility management behaviors associated with previous paging messages transmitted to the user equipment device. Further, the method can comprise facilitating, by the network device, a transmission of a page to the user equipment device. The page can be based on the contextual data and the historical mobility management behaviors. Further, the page can be the paging attempt scheduled for the user equipment device. The user equipment device can be classified as an Internet of Things device.

According to some implementations, the page is a first page, the paging attempt is a first paging attempt, the transmission is a first transmission, and the method further comprises performing, by the network device, an update to a mapping function for the user equipment device. The method can also comprise facilitating, by the network device, a second transmission of a second page as a second paging attempt to the user equipment device based on the contextual data, the historical mobility management behaviors, and the update to the mapping function.

Further to the implementations of the above paragraph, the network device can be a first network device, and the update to the mapping function can be based on signaling interactions with respective network functions of a second network device and a third network device. Alternatively, or additionally, the method can comprise associating the first paging attempt with a first targeted paging procedure and the second paging attempt with a second targeted paging procedure, different from the first targeted paging procedure.

In some implementations, facilitating the transmission of the page to the user equipment device can comprise accessing a paging policy and a context mapping table and configuring the page for the user equipment device based on the paging policy and the context mapping table.

In accordance with some implementations, the page can be a first page, the paging attempt can be a first paging attempt, the transmission can be a first transmission, and the method can comprise facilitating, by the network device, a second transmission of a second page to the user equipment device based on a first determination that a response from the first page was not received from the user equipment device and based on a second determination that a paging policy authorizes a second paging attempt for the user equipment device.

Facilitating the transmission of the page to the user equipment device can comprise, according to some implementations, evaluating an information element of a paging policy indicator flag based on a determination that the paging attempt scheduled for the user equipment device is derived from a downlink data notification. Further to these implementations, the method can comprise executing a paging for the downlink data notification based on implementation of a first policy based on the information element of the paging policy indicator flag being a first value, and a second policy based on the information element of the paging policy indicator flag being a second value.

In some implementations, facilitating the transmission of the page to the user equipment device can comprise executing a short message paging as a function of a mapping policy based on a determination that the paging attempt scheduled for the user equipment device is derived from a short message service indicator.

Further, facilitating the transmission of the page to the user equipment device can comprise facilitating the transmission of the page via a channel configured to operate according to a fifth generation wireless network communication protocol.

Another embodiment relates to a network device that can comprise a processor and a memory that stores executable instructions that, when executed by the processor, facilitate performance of operations. The operations can comprise analyzing a group of contextual data for a user equipment device, mobility management behaviors historically implemented for the user equipment device, and based on an indication that a page request is scheduled to be sent to the user equipment device. The operations can also comprise configuring a paging message for the user equipment device based on the contextual data and the mobility management behaviors. Further, the operations can comprise sending the paging message to the user equipment device.

According to some implementations, configuring the paging message for the user equipment device can comprise reviewing a paging policy and a context mapping table and configuring the paging message based on the paging policy and the context mapping table.

In accordance with some implementations, the operations can comprise evaluating an information element of a paging policy indicator flag based on a determination that the page request scheduled for the user equipment device is received within a downlink data notification. The operations can also comprise configuring the paging message for the downlink data notification according to a first policy based on the information element of the paging policy indicator flag being a first value, and according to a second policy based on the information element of the paging policy indicator flag being a second value.

The operations can comprise, according to some implementations, obtaining information indicative of an identity of the user equipment device from a mapping table and based on a determination that the paging message is received as a short message service indicator. Further, the operations can comprise implementing the page request as a short message page based on the identity and a mapping policy.

Another embodiment relates to a machine-readable storage medium, comprising executable instructions that, when executed by a processor of a mobile device, facilitate performance of operations. The operations can comprise determining a user equipment device is to be paged based on a defined paging procedure. The operations can also comprise analyzing contextual data of the user equipment device and mobility management procedures previously used for paging the user equipment device. Further, the operations can comprise transmitting a page message to the user equipment device. The page message can be configured for the user equipment device based on the contextual data and the mobility management procedures.

In some implementations, the page message can be a first page message, and the operations can comprise updating a mapping function for the user equipment device based on signaling interactions with respective network functions of a group of network devices. The operations can also comprise transmitting a second page message to the user equipment device. The second page message can be configured for the user equipment device based on the contextual data, the mobility management procedures, and the mapping function.

According to some implementations, the operations can comprise evaluating an information element of a paging policy indicator flag based on a determination that the page message is received as a notification via a downlink channel. The operations can also comprise executing a paging for the notification based on implementation of a first policy based on the information element of the paging policy indicator flag being a first value, and a second policy based on the information element of the paging policy indicator flag being a second value.

Further, in some implementations, the operations can comprise executing a short message paging as a function of a mapping policy based on a determination that the page message is received as an indicator via a short message service.

Advanced networks can expand and enhance the intra/inter human-machine connectivity model. While the standards for advanced networks and eco-systems mature, legacy deployments can be leveraged to offer new mobility services and can be further optimized based on access and core network feature enhancements. Paging procedures in wireless communications have existed for several years. However, with the introduction of new categories of wireless devices (e.g., industrial and consumer IoT, and so on) that can operate across multi-standard radio access technologies (RAT) with varying service requirements unlike consumer smart phones, the legacy methods of paging and optimization schemes used in LTE might not be uniformly applicable and optimal for next generation of IoT devices. Such devices have different technical attributes and constraints to operate with and they need to preserve their critical resources, including battery life due to the nature of mobility services for which the devices are targeted.

Given these different types of IoT devices distributed across the industry verticals (e.g., smart cities, smart agriculture, smart parking, smart utilities, and so forth) could exhibit varying sleep patterns when operating in Power Saving Mode (PSM) and/or Extended Discontinuous Reception (eDRX) modes and/or extended coverage mode by virtue of their geographical location, the mobility network has to be extremely intelligent in dealing with such types of devices across the various RAT types in conjunction with the legacy devices. Since a large volume of IoT devices across some set of industry verticals and some set of service providers within each vertical could potentially be in sleep mode for longer durations than their counterparts, the paging schemes used by the serving MME should be extremely intelligent, flexible, and adaptive based on real time learning of the device contextual behaviors as well as the triggers received from IoT service providers.

To drive massive IoT adoption as part of LTE/5G/advanced network wireless evolution, the mobility network control plane intelligence can be enhanced to optimize the overall network paging procedures and resulting efficiencies at the services layer. Due to the wide variety of IoT device categories and their unique characteristics via operational modes, proper classification, grouping and mapping of their contextual data in real time can be important for differentiated paging policy selection and execution in the MME/AMF. By being able to select, execute, monitor, and track the closed-loop paging behaviors in the mobility core control plane function, it is possible to enhance the overall control plane network efficiency as well as the network and end-user service behaviors.

The various aspects discussed herein provide an enhanced paging workflow that can intelligently segregate the incoming requests to devices not only based on service types but also utilize real time contextual mapping via RAN-EPC message exchange. In addition, the workflow can leverage device grouping in conjunction with a tighter correlation methodology in the control plane routing engine that can help in the selection of optimal paging policy and its real time adaptation to meet the specific IoT device service behaviors.

LTE has emerged as one of the main platforms for low power wide area networking and connectivity for IoT enabled objects. Although early LTE networks were designed and optimized for human-originated traffic, the massive connections that could result from new LTE capable M2M/IoT devices could impact the resource utilization efficiencies when serving the broad spectrum of devices (including smart phones, tablets, PCs with next-gen mobile adapters or air cards and so on. Such surge in control plane signaling traffic and loading could be of an increasing concern if the network functions are not adapted with intelligent means to handle such device volumes.

An important mobility management function when handling control plane signaling traffic in the high-speed mobility network is paging. The MME could have predefined paging policies configured by the operator during deployment and such paging policies could be largely static. The policies could be selected by the MME based on the incoming requests coming from its peer nodes for targeted triple play (e.g., voice, messaging, data) mobility services.

The paging policies defined by 3GPP standards provide a high level view and detailed technical implementations are vendor specific based on their own interpretations and subsequent software defined feature capabilities developed in the MME platforms. For smart phones that are predominant in the market place, the paging protocols developed and optimized may be adequate to meet the mobility services supported. However, for IoT devices, such legacy paging methods may not be adequate.

The IoT devices, being less complex to maintain low cost while relying on their precious battery life, operate quite differently from smart phones due to their inherent technical features and capabilities. The legacy smart phone based paging schemes will not be efficient and retransmissions based on lack of proper closed-loop behaviors could result in inordinate signaling against such large device volumes in a single cell or across group of cells distributed across multiple tracking areas within the mobility network. Potential signaling storms associated with such IoT device volumes could be detrimental to the control plane functional stability and may impact legacy services.

To circumvent such network inefficiencies and service impacts resulting from multiple paging as well as retransmissions for IoT devices when interworking between the peer nodes, the MME control plane engine could be enhanced with smart paging for IoT devices, as discussed herein. Such paging protocols can consider the real time contextual data of the IoT devices stored in the MME and enhance it based on further procedural calls towards the MME peer nodes to extract the desired information.

Such data could include a variety of device attributes such as their category, radio access technology, complexity, priority, location, grouping, as well as their specific operational and desired service modes—PSM/eDRX/CE Mode A/CE Mode B/VoLTE/SMS/Data/IP/Non-IP, and so on. Additional intelligence such as historical mobility patterns of these devices and their operational modes could be considered in the dynamic selection of a paging policy and adapt it on the fly (e.g., in real-time or near real-time) to help ensure that the overall network dynamics are not compromised when serving legacy broadband devices.

As discussed herein, the control plane functions, such as the MME in LTE, can be enhanced with the above software defined algorithms that can further optimize the network paging efficiency in a consolidated manner when addressing a variety of devices. With real time monitoring, tracking and analysis of paging performance at the individual services, attempts and devices layer, the control plane intelligence could be further enhanced to deal with the signaling storms than having to re-spin a new function in the same or different data center location within the pool environment. The above software capabilities could be easily extended to the AMF control function within the 5G architecture and as new radio access technologies (e.g., advanced networks) emerge, the algorithms could be further tweaked to adapt to the dynamics of the radio channel, elastic sizing of tracking areas along with the devices operational state to benefit the mobility network design.

FIG. 1 illustrates an example, non-limiting, pictorial representation of paging attempts in advanced networks 100 in accordance with one or more embodiments described herein. It is noted that although various aspects are discussed herein with respect to tracking areas (e.g., TAs), the disclosed aspects are not limited to tracking areas and can include, for example, geographic areas, service areas, and other areas. Further according to some implementations, a variety of mobility scenarios are possible for mobile broadband devices and/or IoT devices based on respective device categories, priorities, groups, complexity, supported feature capabilities, and so on.

As illustrated a network device 102 can transmit one or more paging attempts to various devices within the advanced networks 100. According to some implementations, the network device 102 can be a Mobility Management Entity (MME) or another network device. The various devices can be in different tracking areas, illustrated as a first tracking area (TA1), a second tracking area (TA2), a third tracking area (TA3), a fourth tracking area (TA4), and a fifth tracking area (TA5). It is noted that, although certain devices and tracking areas are illustrated and described, a variety of mobility scenarios are possible for mobile broadband devices and/or IoT devices based on their device categories, priorities, groups, complexity, supported feature capabilities, and so on.

Further, a first page attempt is depicted by first circle 104, a second page attempt is depicted within a second circle 106, and a third page attempt is depicted within a third circle 108. Service providers can provision (e.g., program for use) their MMEs (e.g., the network device 102) to be able to reach the devices (e.g., User Equipment Devices (UEs)) in a given region. For example, service providers can provision their MMEs with appropriate paging methods, including the total number of paging attempts (e.g., a three attempt example is illustrated in FIG. 1, although a different number of paging attempts can be utilized). The appropriate paging methods can also comprise timing between successive paging attempts for each attempt. As discussed herein, such methods could be used and/or further adapted to minimize signaling load on the serving RAN resources in the network.

A paging method that can be used includes the last seen eNB (e.g., the first paging attempt of a last seen eNB 110, depicted within a first circle 104). The MME can page the eNB that sent the last TAU request or Service Request. Alternatively, the MME can page the last seen eNB List. In this case, the MME can page up to a maximum configurable number of the last seen eNBs based on the UE's past mobility history. The maximum number of eNBs to be paged during a page attempt could be specified as an operator configurable parameter with the target paging method. If there is no value specified, a default number of eNBs could be used per implementation specific means.

In another example, the MME can page the last seen Tracking Area (e.g., the second paging attempt of a last seen tracking area (TA2), depicted within the first circle 104). For example, the MME can page eNBs (e.g., the last seen eNB 110 and another eNB 112 in TA2) in a given tracking area associated with the last TAU request or service request received from the UE. In a further example, the MME can page the last seen Tracking Area List (e.g., all the tracking areas TA1, TA2, TA3, TA4, and TA5 in this example, denoted by third circle 108). In this case, the MME can page eNBs associated with the last registered Tracking Area Indicator (TAI), the TAIs of each defined neighbor of the last registered TAI, the old last registered TAI if available, the older last registered TAI if available, and last seen TAI if different from all other old TAIs. This can ensure that the UE is paged in all of the TAIs where the UE is registered.

As part of the paging method definition, the MME application can set a page response timer. The MME can maintain a page request count for each network triggered service request procedure and can use the page request count to determine the paging method and timer values used for current page attempt.

When the MME sends S1AP paging message, the MME can expect that the UE responds with a service request. If the paging timer expires and the MME has not received the service request, the MME can increment the number of page attempts. Using the page attempt count, the MME can select the method for next page request. When the MME exhausts the maximum number of attempts supported in a given method for a UE without a successful response, the MME can send a Downlink Data Notification (DDN) failure to the SGW.

Figure 2:
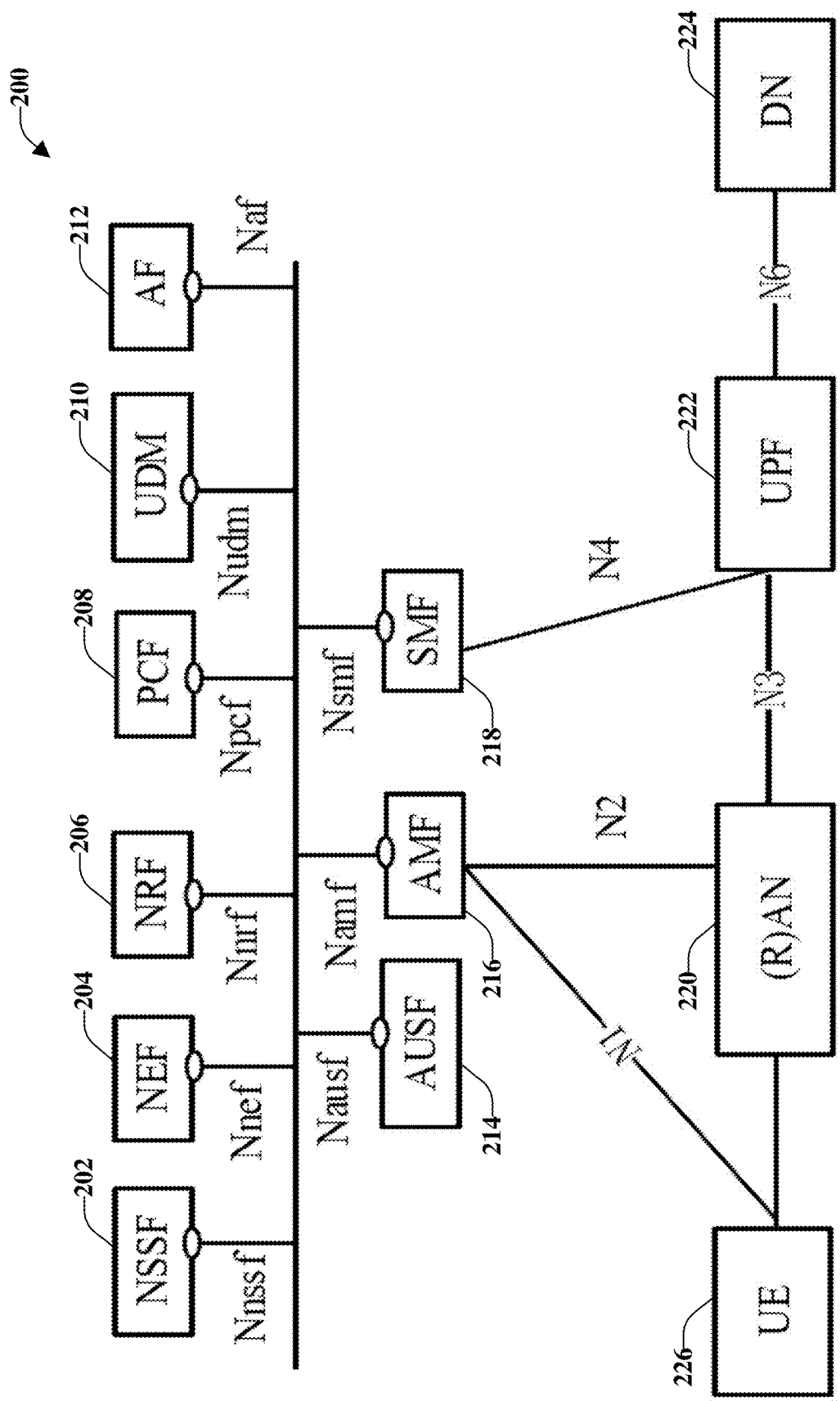
FIG. 2 illustrates an example, non-limiting, high level system architecture for a 5G network, in accordance with one or more embodiments described herein.

FIG. 2 illustrates and example, non-limiting, high level system architecture 200 for a 5G network, in accordance with one or more embodiments described herein. The 5G high level system architecture 200 comprises various Network Functions (NF). These network functions include, but are not limited to, a Network Slice Selection Function (NSSF) 202, a Network Exposure Function (NEF) 204, a Network Repository Function (NRF) 206, a Policy Control Function (PCF) 208, a Unified Data Management (UDM) 210, an Application Function (AF) 212, an Authentication Server Function (AUSF) 214, an Access and Mobility Management Function (AMF) 216, a Session Management Function (SMF) 218, a (Radio) Access Network ((R)AN) 220, a User Plane Function (UPF) 222, a Data Network (DN) 224 (e.g. operator services, Internet access, third party services), and one or more UEs 226. In the example of FIG. 2, service-based interfaces can be used within a control plane.

Figure 3:
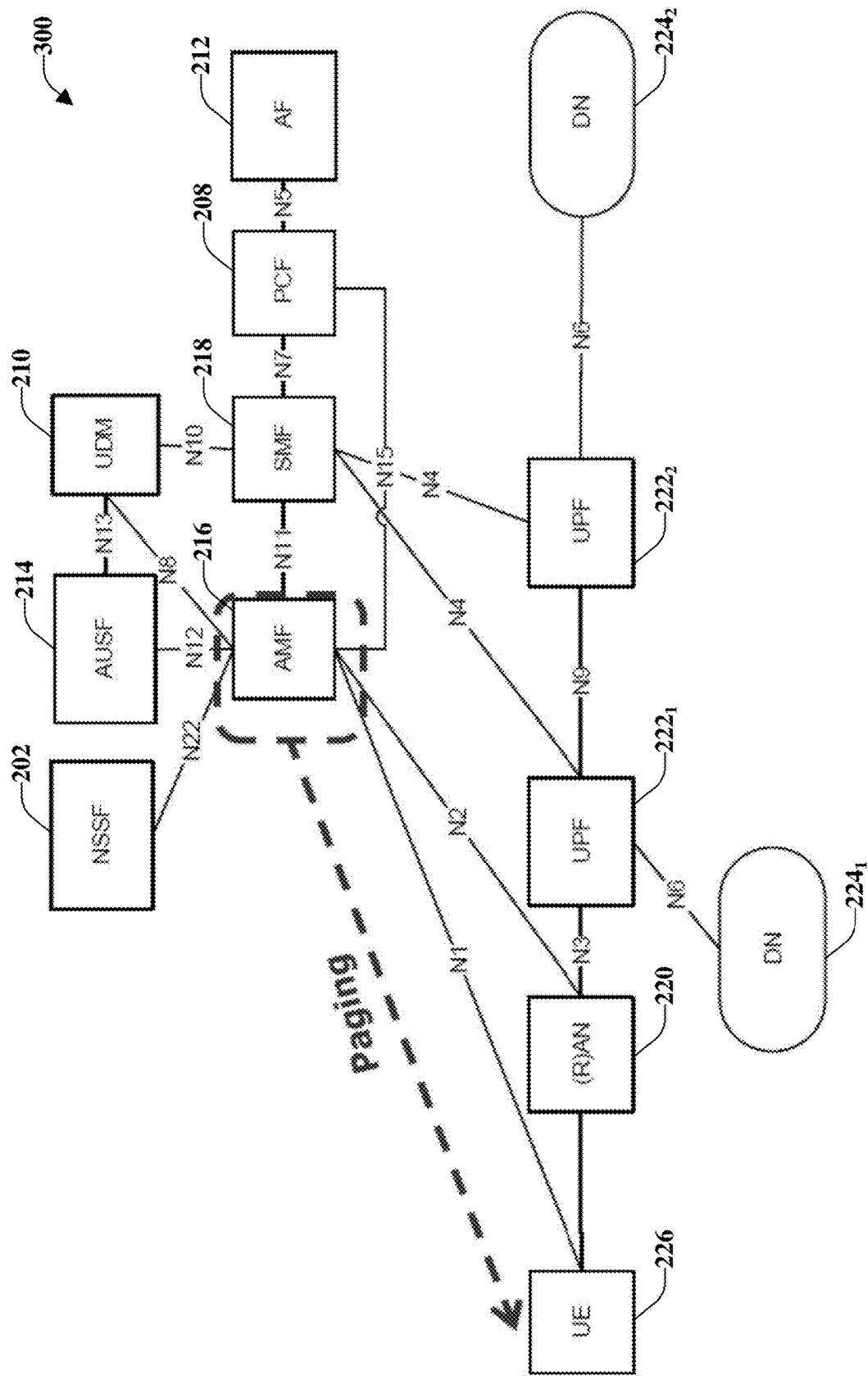
FIG. 3 illustrates an example, non-limiting, high level system architecture for a 5G network in reference point representation in accordance with one or more embodiments described herein.

FIG. 3 illustrates an example, non-limiting, high level system architecture 300 for a 5G network in reference point representation in accordance with one or more embodiments described herein. Repetitive description of like elements employed in other embodiments described herein is omitted for sake of brevity.

As illustrated, the UPF 222 is illustrated as two separate functions, denoted as 2221 and 2222. Further, the DN 224 is illustrated as two separate functions, denoted as 2241 and 2242. In a 5G core network, for example, the AMF 216 hosts a similar paging application function as the MME in LTE core network. The AMF 216 pages the UE 226 in Connection Management Idle Mode for the UE 226 to respond with NAS layer service request procedure.

Figure 4:
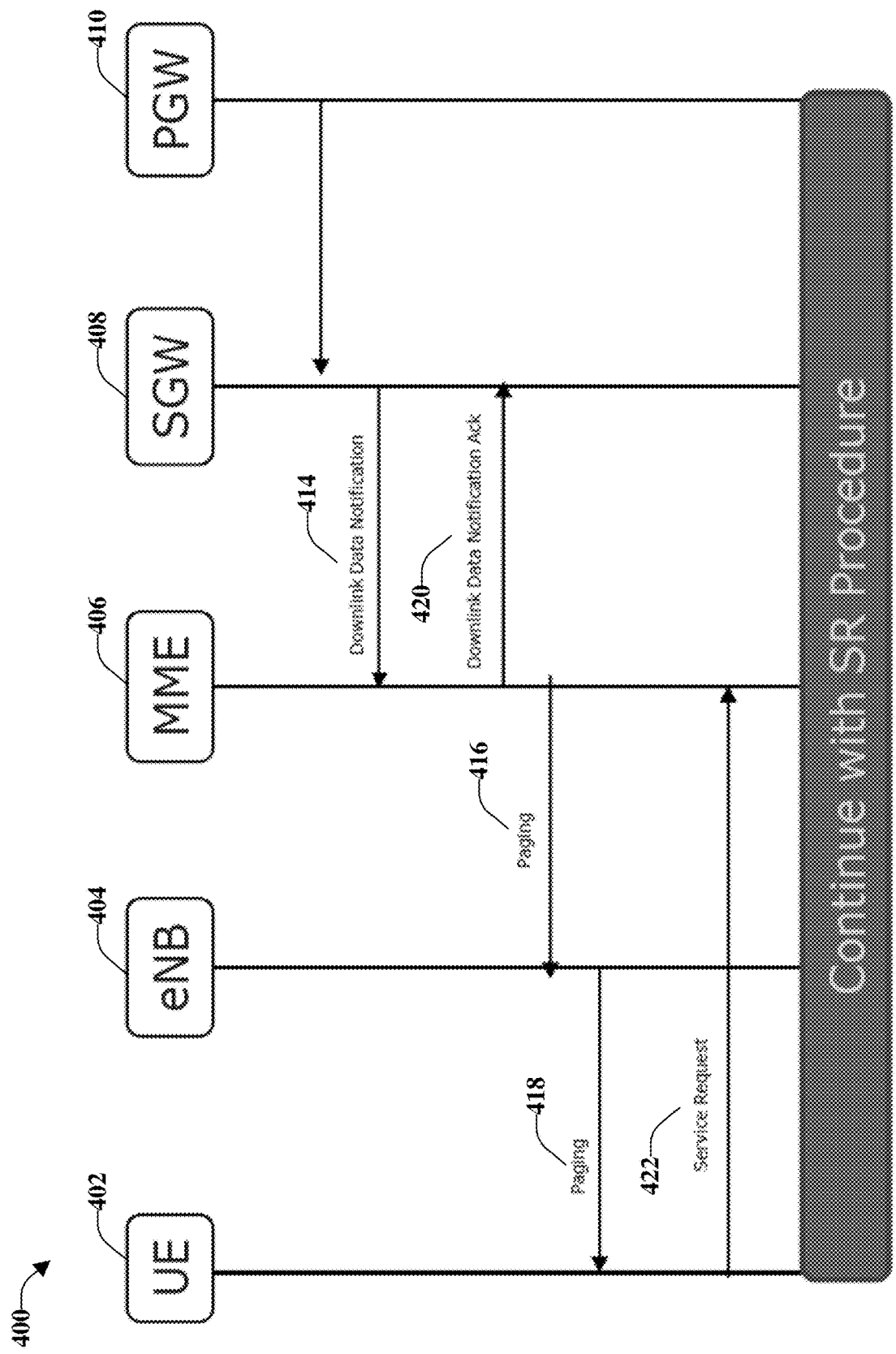
FIG. 4 illustrates an example, non-limiting, paging procedure in accordance with one or more embodiments described herein.

FIG. 4 illustrates an example, non-limiting, paging procedure 400 in accordance with one or more embodiments described herein. Repetitive description of like elements employed in other embodiments described herein is omitted for sake of brevity.

Devices associated with the paging procedure include a UE 402 (e.g., the UE 226), an eNB 404, an MME 406, a Service Gateway or SGW 408, and a PGW 410 (Packet Gateway).

The PGW 410 sends downlink data to the SGW 408. The SGW 408 sends Downlink Data Notification (DDN 414) to the MME 406 The paging procedure 400 can be initiated by the MME 406 (through the eNB 404) to establish a NAS signaling connection to a UE 402, as indicated at 416 and 418. The MME 406 can also reply to the SGW 408 with a downlink data notification acknowledgement 420.

The MME 406 application can send paging messages to the eNBs (e.g., the eNB 404) depending upon the paging method and location of the UE 402. The eNB 404 can page the UE 402 in cells that belong to the list of tracking areas (or other areas) indicated in a TAI list (or another list). The UE can response with a service request 422. The paging method chosen can involve a multiple number of attempts with related timers based on operator specific provisioning against a given service type.

Each paging attempt can be individually associated with a targeted paging method. Given the multiple number of attempts, the service provider can choose to apply a specific method to a given paging attempt to optimize the paging behavior in the network as well as the overall signaling efficiency associated with data and messaging services.

The paging methods that have been developed to-date and in turn optimized for traditional mobile broadband (MBB) devices may not be ideally suited for a variety of IoT devices with unique categories as well as their varying radio access capabilities. Such paging methods could be open-ended in the sense that the eNB might not leverage the complete intelligence received directly from the MME based on the critical contextual UE data when paging the UE.

With the advanced features such as Power Savings Mode (PSM), Coverage Extension (CE) modes—A & B, extended idle mode discontinuous reception (eDRX) supported by a variety of these IoT devices, the access and core network functions supporting such devices have to be carefully designed. EPS mobility management and session management procedures need to be tightly coordinated and contextual information of the devices used when paging to ensure there are no inordinate delays in the targeted delivery of IoT mobility services and resulting end user behaviors across the serving industry verticals.

As the IoT devices distributed in several locations (unlike smart phones) could operate in any one or all of these modes simultaneously (PSM/CE/eDRX) at any given time subject to their device as well as radio network capabilities, location and mobility conditions, the real time device contextual data and mapping with the device grouping, complexity, priority access, identity, category, capability information in the MME is extremely critical during paging policy selection. No such methods are defined in the latest 3GPP standards and/or cross-functional network optimization schemes exist today when delivering mobility services to a mix of IoT devices.

Provided herein is a new paging workflow method in the MME that considers the composite view of the IoT devices contextual data as well as its historical mobility management behaviors when sending a new page to wake up the device. The workflow includes a continuous real time update of the mapping function based on signaling interactions with the RAN (eNB) and EPC (SAEGW, HSS) core network functions.

During interactions with RAN on the S1AP signaling, the MME can dynamically adapt its internal storage functions by being able to handle complex IoT devices utilizing their radio paging capabilities. The MME could rely on this internally mapped detailed contextual data when selecting the appropriate paging schemes and dynamically adapt a given selected scheme with rules based criteria along with the mobility network dynamics for targeted IoT services delivery.

Figure 5:
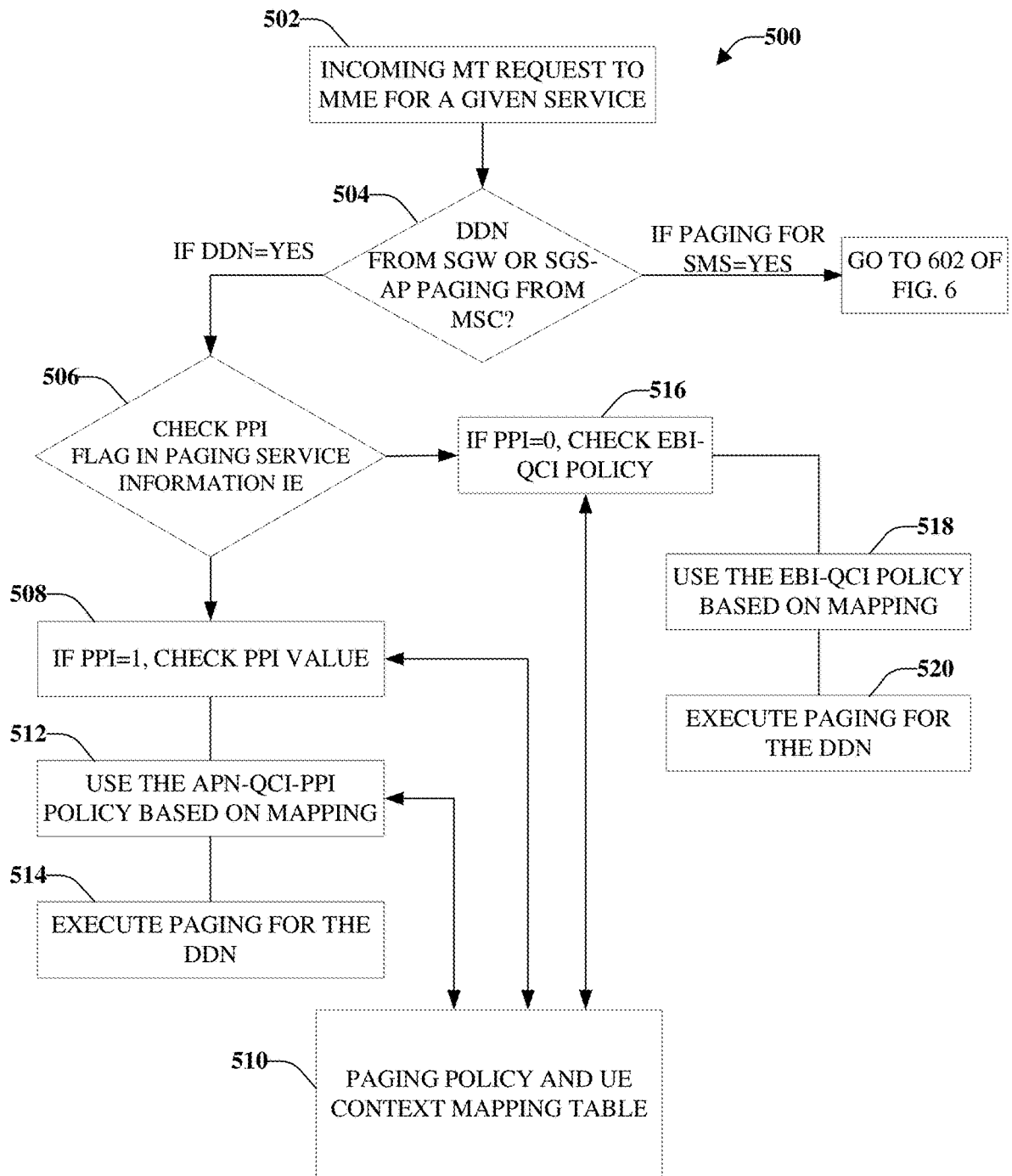
FIG. 5 illustrates an example, non-limiting, paging workflow for a page request received as a downlink data notification in accordance with one or more embodiments described herein.

FIG. 5 illustrates an example, non-limiting, paging workflow 500 for a page request received as a downlink data notification in accordance with one or more embodiments described herein. Repetitive description of like elements employed in other embodiments described herein is omitted for sake of brevity.

At 502 an incoming Mobile Terminated (MT) request to an MME (e.g., the MME 406) for a given service can be received. A determination can be made, at 504, whether the MT request is a Downlink Data Notification (DDN) from an SGW (e.g., the SGW 408) or SGs-AP paging from a Mobile Switching Center (MSC). If the incoming request is a SGs-AP paging from MSC, the paging workflow 500 continues at 602 of FIG. 6.

Alternatively, if the incoming MT request is a DDN, the paging workflow 500 continues, at 506 and a Paging Policy Indicator (PPI) flag in the paging service Information IE (Information Element) can be checked. If the PPI is equal to a first value (e.g., "1"), at 508, the PPI value can be checked. For example, a paging policy and UE context mapping table 510 can be accessed to check the PPI value. Further, at 512, a policy (e.g., an Access Point Name (APN) policy, an Application Centric Infrastructure (ACI) policy, a Policy Programming Interface (PPI) policy, and so on) can be used based on mapping. The paging can be executed, at 514, for the DDN.

The paging policy and UE context mapping table 510 can interface with the processes at 508 and at 512. The paging policy and UE context mapping table 510 can comprise, for example: Public Land Mobile Network (PLMN)/International Mobile Subscriber Identity (IMSI-NS), Group-ID, category, basic paging (default), SMS CS service based paging, SMS PS service based paging, voice service based paging, APN-Quality of Service (QoS) Class Identifier (QCI)-PPI, Evolved Packet System (EPS)-Bearer Identity (EBI)-QCI, QCI, priority access, complexity, Coverage Enhancement (CE) Mode A, CE Mode B, PSM, eDRX, PSM+eDRX+CE Mode A and/or Mode B, and/or location.

If the PPI is determined, at 506, to be equal to a second value (e.g., "0"), the EBI-QCI policy can be checked, at 516. In addition, the paging policy and UE context mapping table 510 can be referenced. Further, at 518, the EBI-QCI policy based mapping can be used and, at 520, paging for the DDN can be executed.

Figure 6:
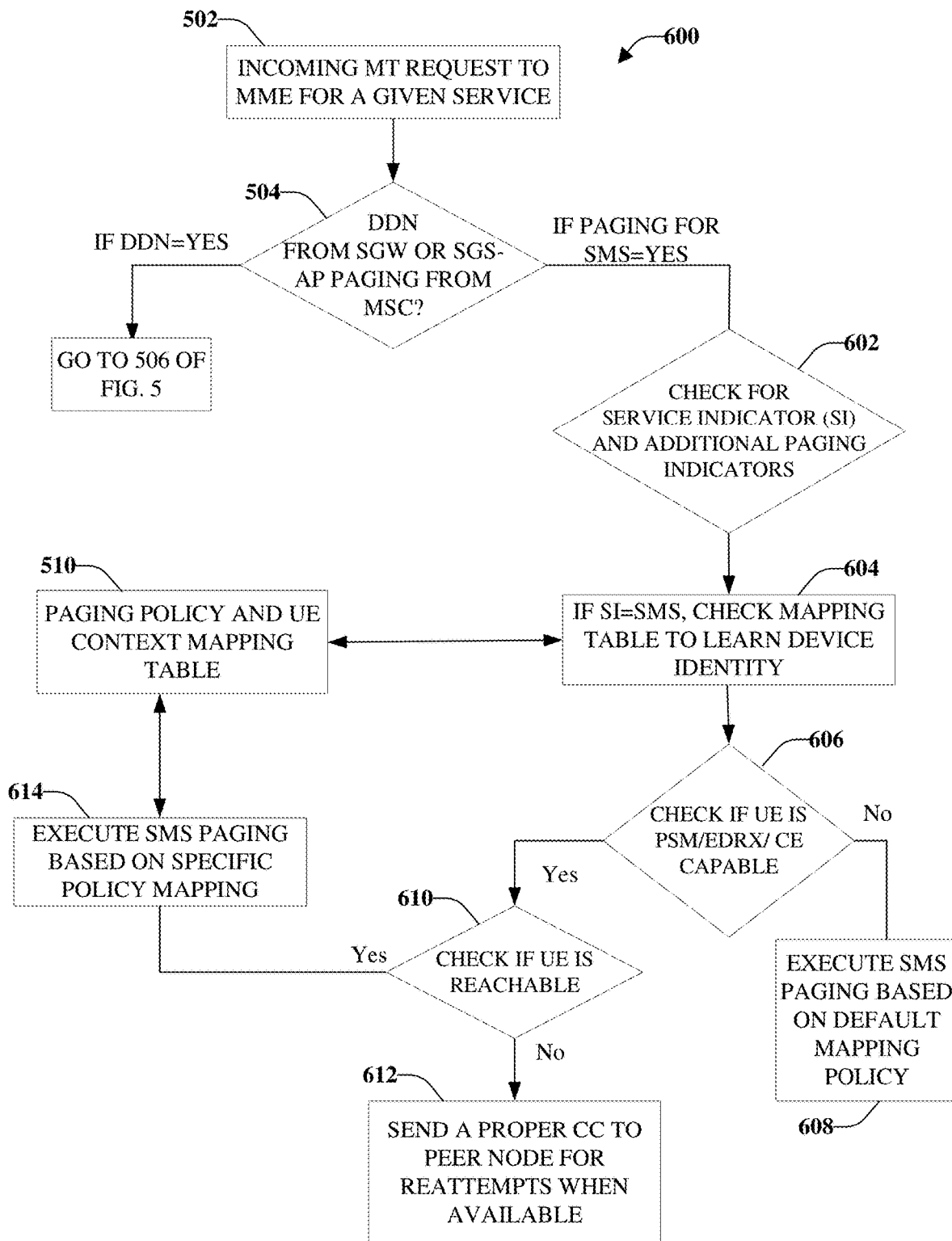
FIG. 6 illustrates an example, non-limiting, paging workflow for a page request received as a short message service in accordance with one or more embodiments described herein.

FIG. 6 illustrates an example, non-limiting, paging workflow 600 for a page request received as a short message service in accordance with one or more embodiments described herein. Repetitive description of like elements employed in other embodiments described herein is omitted for sake of brevity.

At 502 an incoming Mobile Terminated (MT) request to an MME (e.g., the MME) for a given service can be received. A determination can be made, at 504, whether the MT request is a Downlink Data Notification (DDN) from an SGW (e.g., the SGW 408) or SGs-AP paging from a Mobile Switching Center (MSC). If the incoming MT request is a DDN, the paging workflow 600 continues, at 506 of FIG. 5.

Alternatively, if the incoming request is a SGs-AP paging from MSC (e.g., if paging for SMS), the paging workflow 600 continues at 602 where a Service Indicator (SI) and/or one or more additional paging indicators can be checked. If the SI is equal to the SMS, a mapping table (e.g., the paging policy and UE context mapping table 510) can be checked to determine the device identity.

Otherwise, at 606, the UE is checked to determine if the UE is PSM/eDRX/CE capable. If the UE is not PSM/eDRX/CE capable ("NO"), at 608, SMS paging is executed based on default policy mapping. Alternatively, if it is determined at 606 that the UE is PSM/eDRX/CE capable ("YES), at 610, the UE is checked to determine if it is reachable (e.g., able to be communicated with). If not, at 612, a proper CC is sent to the peer node for reattempts, when available. However, if the UE is able to be reached, at 610, SMS paging can be executed, at 614, based on specific policy mapping. For example, the SMS paging can be executed at 614 by referencing the paging policy and UE context mapping table 510.

Figure 7:
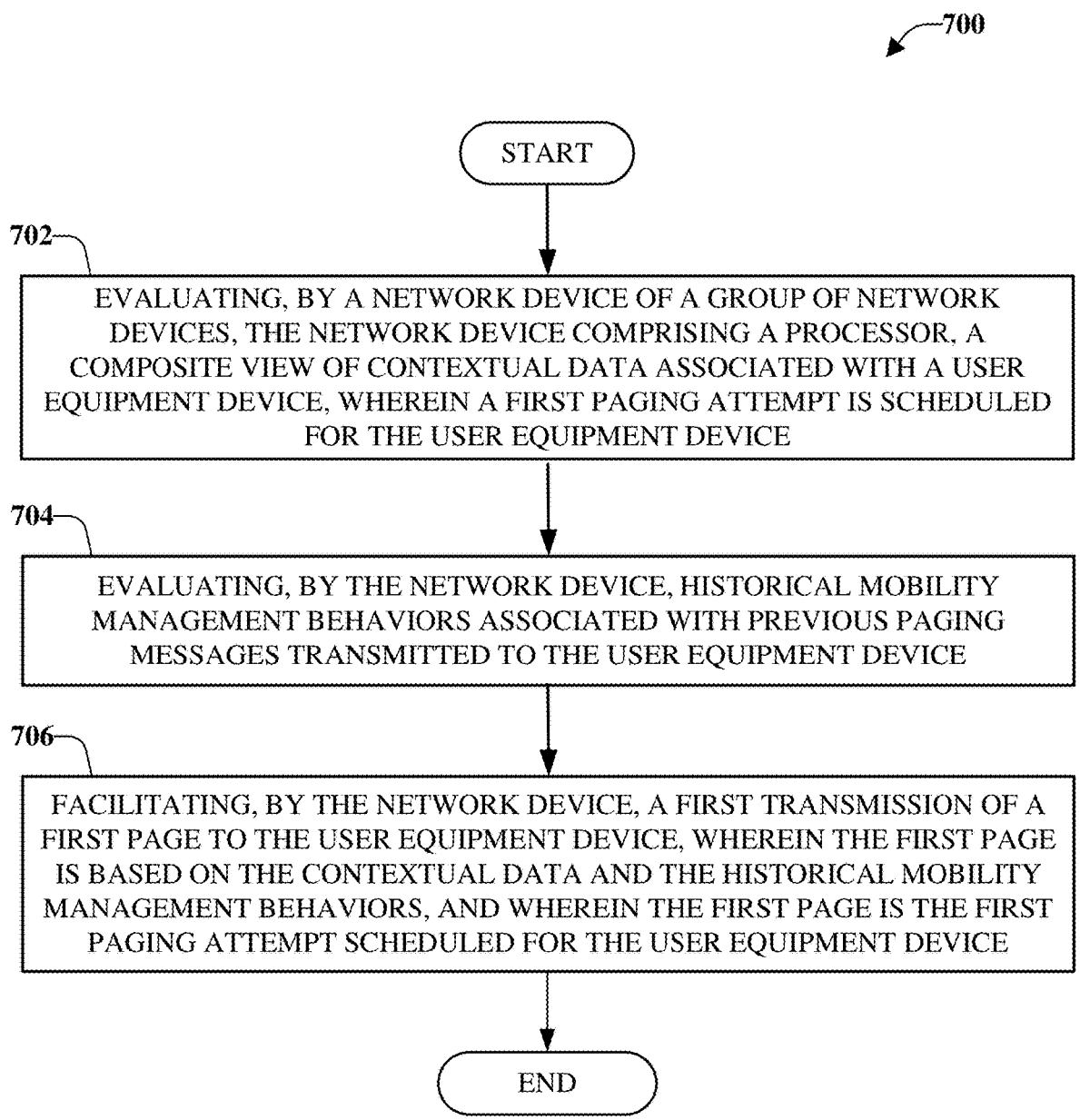
FIG. 7 illustrates a flow diagram of an example, non-limiting, computer-implemented method that facilitates device contexts, operational modes, and policy driven enhancements for paging in advanced networks in accordance with one or more embodiments described herein.

FIG. 7 illustrates a flow diagram of an example, non-limiting, computer-implemented method 700 that facilitates device contexts, operational modes, and policy driven enhancements for paging in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device (e.g., a network device) comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a network device of a group of network devices operatively coupled to one or more processors, can evaluate a composite view of contextual data associated with a user equipment device. The evaluation can occur based on a determination that a first paging attempt is scheduled for the user equipment device. According to some implementations, the contextual data can comprise a device capability, a radio network capability, as well as other parameters and/or criteria. The user equipment device can be classified as an internet of things device. At 704, the network device can evaluate historical mobility management behaviors associated with previous paging messages transmitted to the user equipment device. The historical mobility management behaviors (as well as other information) can be retained in a data store associated with the network device and/or accessible by the network device.

Further, at 706, the network device can facilitate a first transmission of a first page to the user equipment device. The first page can be based on the contextual data and the historical mobility management behaviors. The first page can be the first paging attempt scheduled for the user equipment device. In an example, facilitating the first transmission of the page to the user equipment device can comprise facilitating the first transmission of the page via a channel configured to operate according to a fifth generation wireless network communication protocol.

In some implementations, to facilitate the first transmission of the first page, a paging policy and a context mapping table (e.g., the paging policy and UE context mapping table 510) can be accessed, and the page can be configured for the user equipment device based on the paging policy and the context mapping table.

According to some implementations, a mapping function for the user equipment device can be updated and a second transmission can be facilitated to the user equipment device. The second transmission can be of a second page as a second paging attempt to the user equipment device based on the contextual data, the historical mobility management behaviors, and the update to the mapping function. Further to this implementation, the update to the mapping function can be based on signaling interactions with respective network functions of one or more other network devices. Additionally, or alternatively, the first paging attempt can be associated with a first targeted paging procedure and the second paging attempt can be associated with a second targeted paging procedure, different from the first targeted paging procedure.

In accordance with some implementations, facilitation of at least a second transmission of at least a second page to the user equipment device can be performed based on at least a first determination that a response from the first page (or a subsequent page) was not received from the user equipment device and based on at least a second determination that a paging policy authorizes a second (or subsequent) paging attempt for the user equipment device.

Figure 8:
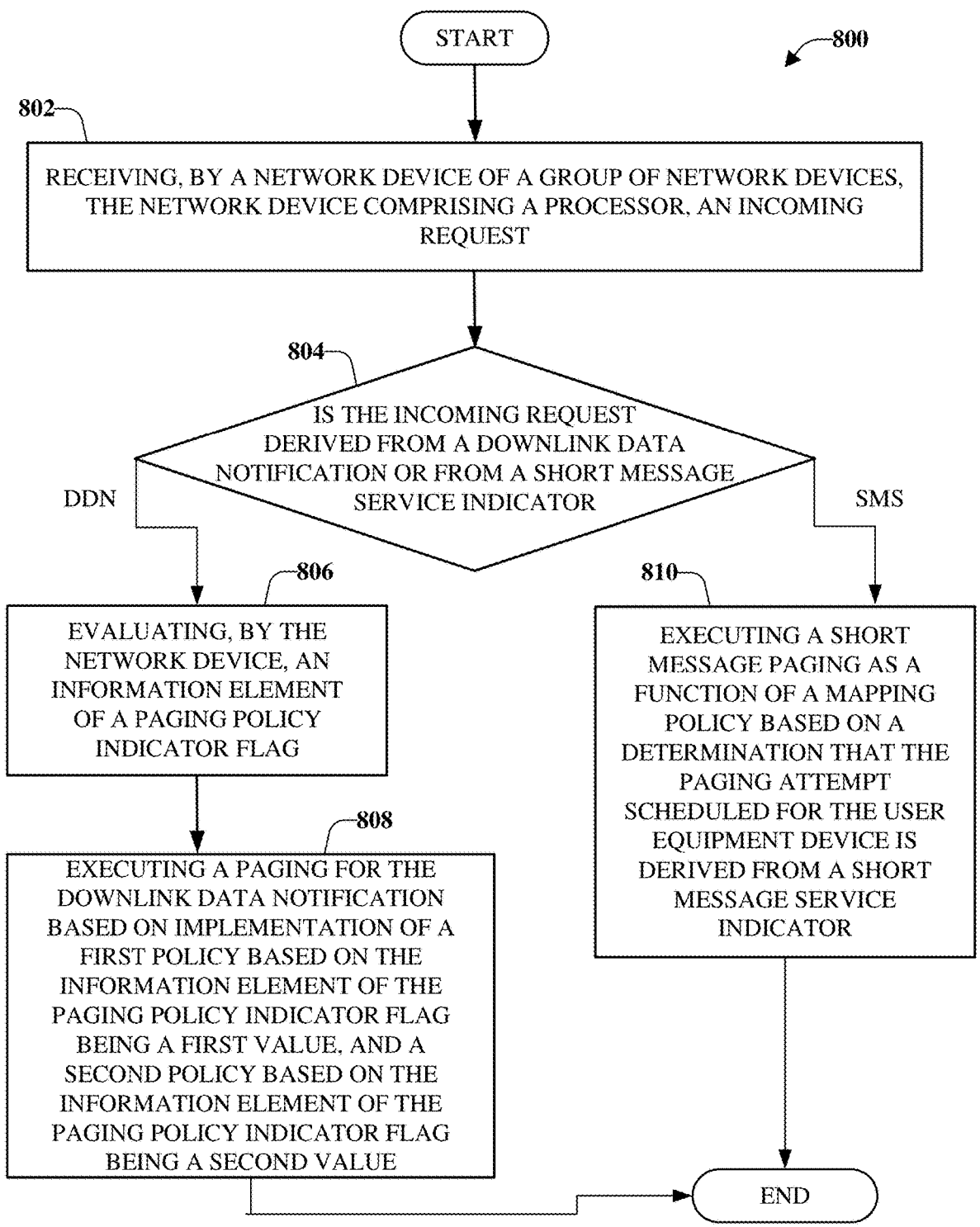
FIG. 8 illustrates a flow diagram of an example, non-limiting, computer-implemented method that facilitates paging in advanced networks in accordance with one or more embodiments described herein.

FIG. 8 illustrates a flow diagram of an example, non-limiting, computer-implemented method 800 that facilitates paging in advanced networks in accordance with one or more embodiments described herein. Repetitive description of like elements employed in other embodiments described herein is omitted for sake of brevity.

In some implementations, a system comprising a processor can perform the computer-implemented method 700, the computer-implemented method 800, and/or other methods discussed herein. In other implementations, a device (e.g., a network device) comprising a processor can perform the computer-implemented method 700, the computer-implemented method 800, and/or other methods discussed herein. In other implementations, a machine-readable storage medium, can comprise executable instructions that, when executed by a processor, facilitate performance of operations, which can be the operations discussed with respect to the computer-implemented method 700, the computer-implemented method 800, and/or other methods discussed herein. In further implementations, a computer readable storage device comprising executable instructions that, in response to execution, cause a system comprising a processor to perform operations, which can be operations discussed with respect to the computer-implemented method 700, the computer-implemented method 800, and/or other methods discussed herein.

At 802 of computer-implemented method 800, a network device of a group of network devices operatively coupled to one or more processors, can receive an incoming request (e.g., 502 of FIG. 5). The incoming request can be an incoming MT request to an MME for a given service. At 804, a determination is made whether the incoming request is derived from a downlink data notification or from a short message service indicator (e.g., 504 of FIG. 5).

If the determination is that the incoming request is derived from a downlink data notification, at 806, the network device can evaluate an information element of a paging policy indicator flag. At 808, the network device can execute a paging for the downlink data notification based on implementation of policy (e.g., 506, 508, and 512-520 of FIG. 5). The policy can be a first policy based on the information element of the paging policy indicator flag being a first value. For example, the first value can be a value of "0" and the first policy can be an APN-ACI-PPI policy. Alternatively, the policy can be a second policy based on the information element of the paging policy indicator flag being a second value. For example, the second value can be a value of "1" and the second policy can be an EBI-QCI policy.

Alternatively, if it is determined, at 804 that the incoming request is derived from a short message service indicator, at 810, the network device can execute a short message paging as a function of a mapping policy (e.g., discussed with respect to FIG. 6).

An IoT use case/scenario that can benefit from the disclosed aspects, including the MME Paging workflows, includes IoT devices with PSM and/or eDRX capabilities attached to a given MME pool. For IoT devices operating in PSM only mode, MME can extract the PSM timing data (T3324-Active Time and T3412-Extended TAU Timer) received from the UE during Attach/TAU and store it in the UE context. Map this next timing availability based on sleep mode and/or mobile originated signaling patterns in conjunction with the other critical device attributes such as specific group ID associated with a given industry vertical, IMSI number series, priority, location etc. and service attributes such as requested messaging/data services.

For devices operating in eDRX only mode, MME can extract the eDRX timing data (Paging Time Window (PTW) and TeDRX-Cycle Duration) received from the UE during Attach/TAU and store it in the UE context. Map this next timing availability for paging based on its reachability and/or mobile originated signaling patterns in conjunction with the other critical device attributes such as specific group ID associated with a given industry vertical, IMSI number series, priority, location etc. and service attributes such as requested messaging/data services.

For devices operating in combined PSM and eDRX modes, MME can extract the PSM and eDRX timing data received from the UE and store it in the UE context. MME can grant both capabilities for the devices during normal circumstances such as when there is no impending overload based on serving concurrent users as well as specific services. MME can also grant only one of the two capabilities based on an operator defined rules or external triggers received from targeted IoT service providers via an API gateway such as Service Capability Exposure Function (SCEF).

Another IoT use case/scenario that can benefit from the disclosed MME Paging workflow includes IoT devices with CE Mode A capabilities attached to a given MME pool. The MME can extract the CE Mode A specific data (cell identifier and coverage enhancement level for Mode A) received from the RAN and store it in the UE context. Map this CE Mode A context in conjunction with the other critical device attributes such as specific group ID associated with a given industry vertical, IMSI number series, priority, location etc. and service attributes such as requested messaging/data/voice services. According to some implementations, QCI based paging setup procedures can be allowed or blocked for CE Mode A devices for mobile terminated voice calls based on internal rules such as threshold alert for coverage enhancement levels.

A further IoT use case/scenario that can benefit from the disclosed MME Paging workflow includes IoT devices with CE Mode B capabilities attached to a given MME pool. The MME can extract the CE Mode B specific data (cell identifier and coverage enhancement level for Mode B) received from the RAN and store it in the UE context. Map this CE Mode B context in conjunction with the other critical device attributes such as specific group ID associated with a given industry vertical, IMSI number series, priority, location etc. and service attributes such as requested messaging/data/voice services. According to some implementations, QCI based paging setup procedures can be allowed or blocked for CE Mode B devices for mobile terminated voice calls based on internal rules such as threshold alert for coverage enhancement levels.

According to some implementations, the disclosed aspects, including the above workflow, can be easily extended to 5G network architecture and design with enhancements to the following functions when serving a wide variety of IoT devices. A function can be AMF—Access Mobility Management Function (use of mobility management contextual data for paging). Another function can be SMF—Session Management Function (use of session behaviors and downlink data triggers for paging). A further function can be UDM—User Data Management (use of device specific subscription information and context mapping). Yet another function can be NEF—Network Exposure Function (use of direct API access between AMF and IoT service providers via NEF).

The explosive growth in IoT connected devices will increase global data transmissions annually creating competitive transformation of day-to-day business practices for mobile service providers across all markets, operations and bringing in new opportunities. With a variety of standards defined devices that are being considered for deployment using the high-speed converged IP mobility network infrastructure and its continued evolution, the reachability of such devices in a mobility environment is pivotal to the success of IoT services launched across the industry verticals.

The disclosed aspects provide several benefits to wireless operators including enhanced reachability of IoT devices in an all-IP mobility networking environment by their respective service providers on-demand at any given time, location and service needs. Another benefit relates to protection of legacy device paging behaviors in the network in conjunction with IoT devices when served by the same MME or set of MMEs in a given regional pool or across pools. A further benefit includes intelligent mobility control plane network functions design with selective and differentiated paging algorithms developed in MME for IoT devices based on real time device dynamics as well as targeted messaging, data and voice services for such devices when served by the MMEs. Yet another benefit includes natural extension of such software defined paging algorithms in MME to its 5G equivalent functions such as AMF/SMF to meet the demands of next-generation massive mobile connectivity in ultra-densified new radio environments, new core network functions, applications and services. Still another benefit relates to adaption of such paging algorithms within the AMF as well as via appropriate Core-RAN pairing during network slicing to meet slice/location-specific IoT mobility services on-demand with service provider specific stringent quality requirements. Still another benefit includes integrated real-time monitoring and data analytics capabilities in the mobility control plane to track paging behaviors at the node/slice/service/device category/device capability grouping level supported in the network. A further benefit relates to optimizing investments (e.g., capital expenditures, operating expenditures, and so on) in converged mobility infrastructure with intelligent algorithms and resulting capacity savings via efficient control plane signaling traffic exchange. Another benefit includes cost-effective means to drive the adoption of massive IoT/Machine Type Communications (MTC) with native cloud based core network architectures and provide differentiated services-revenue models.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Multiple Input, Multiple Output (MIMO) systems can significantly increase the data carrying capacity of wireless systems. For these reasons, MIMO is an integral part of the $3^{rd}$ and $4^{th}$ generation wireless systems. 5G systems can also employ MIMO systems, also called massive MIMO systems (e.g., hundreds of antennas at the Transmitter side and/Receiver side). In an example of a $(N_t,N_r)$ system, where $N_t$ denotes the number of transmit antennas and $N_r$ denotes the receive antennas, and where N is an integer, the peak data rate multiplies with a factor of $N_t$ over single antenna systems in rich scattering environment.

Described herein are systems, methods, articles of manufacture, and other embodiments or implementations that can facilitate device contexts, operational modes, and policy driven enhancements for paging in advanced networks. Facilitating device contexts, operational modes, and policy driven enhancements for paging in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (cRAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
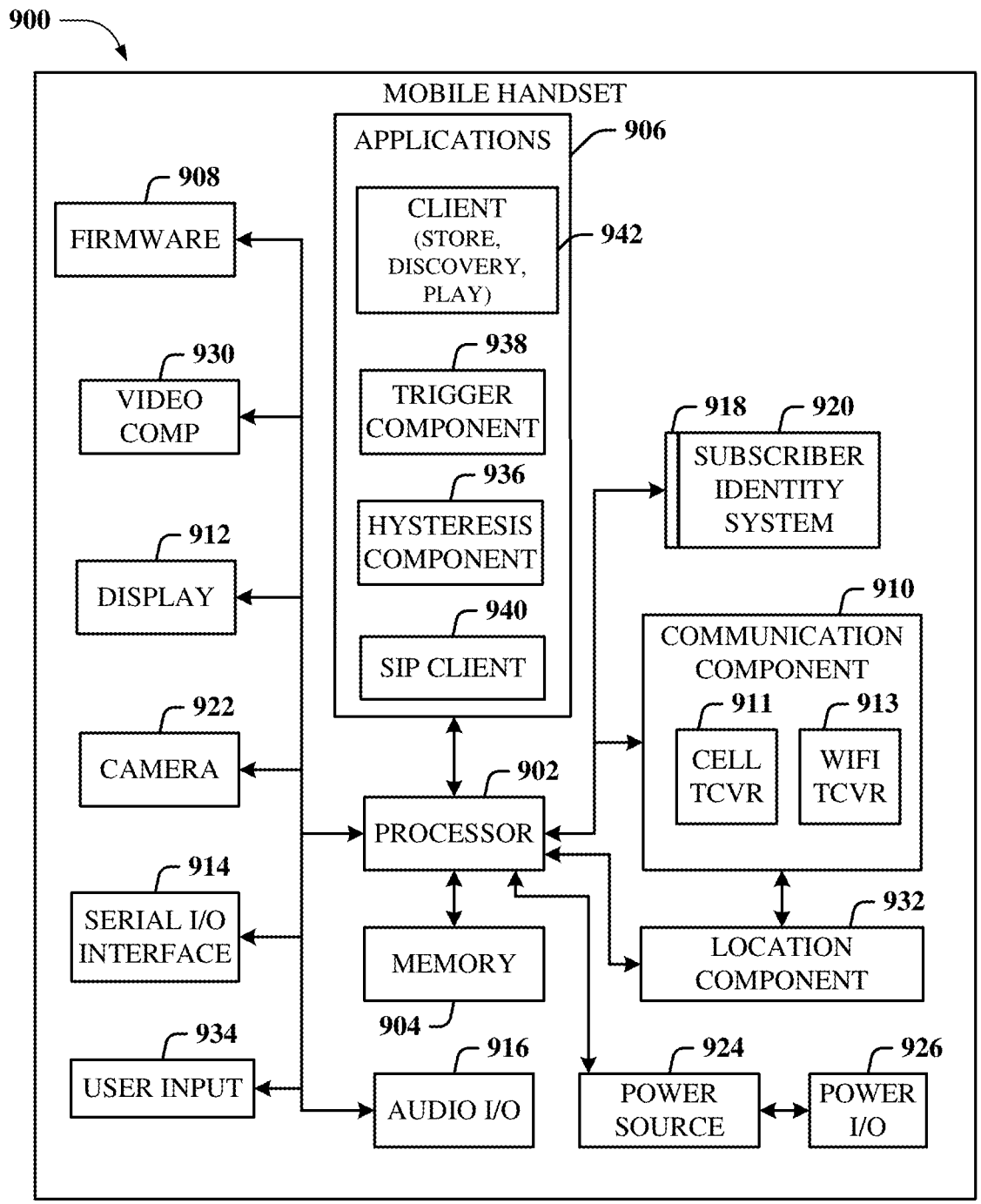
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, Digital Video Disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
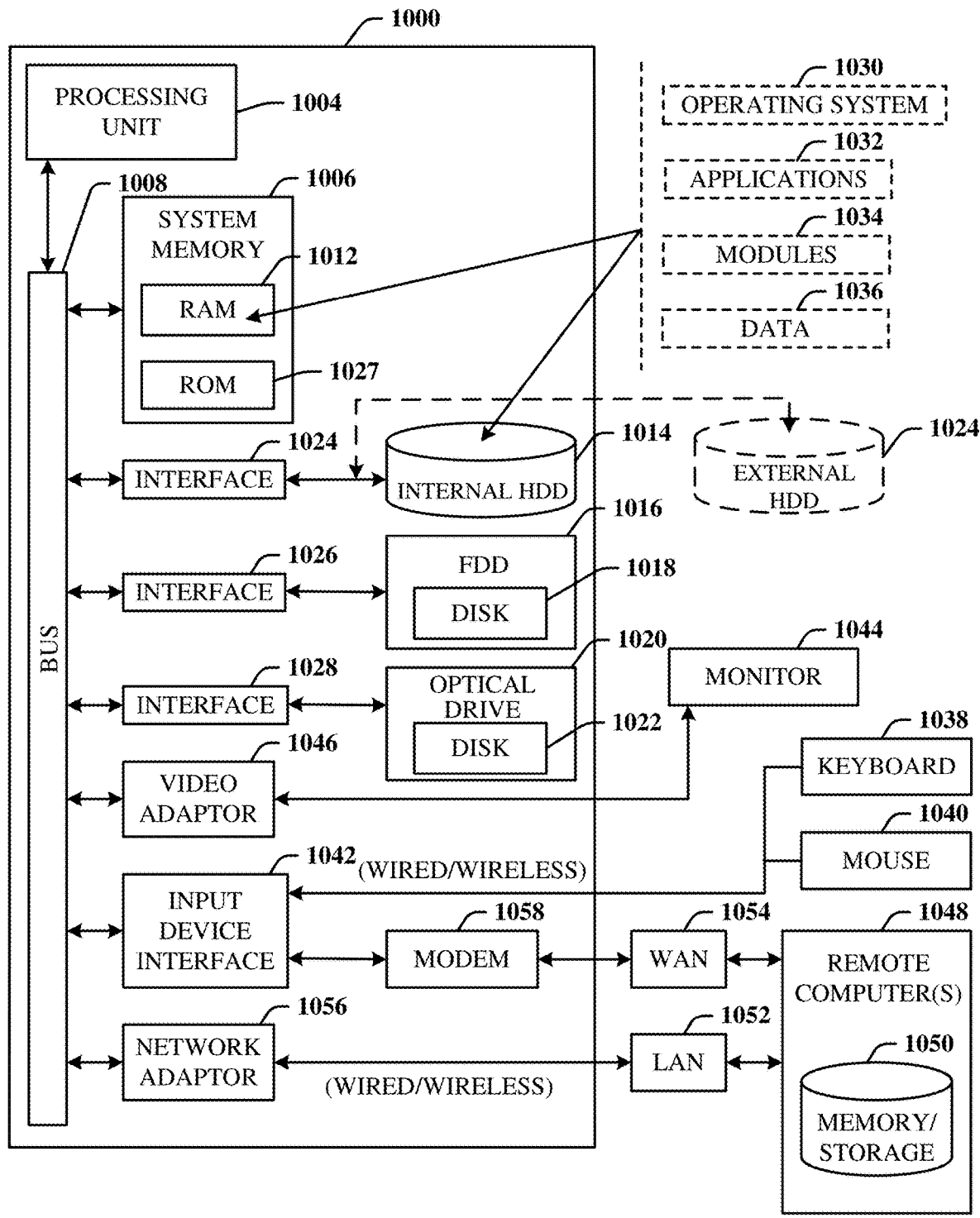
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, Digital Video Disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes Read-Only Memory (ROM) 1027 and Random Access Memory (RAM) 1012. A Basic Input/Output System (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal Hard Disk Drive (HDD) 1014 (e.g., Enhanced Integrated Drive Electronics (EIDE), Serial Advanced Technology Attachment (SATA)), which internal hard disk drive 1014 can also be configured for external use in a suitable chassis (not shown), a magnetic Floppy Disk Drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System for Mobile Communications (GSM), Universal Mobile Telecommunications System (UMTS), Worldwide interoperability for Microwave Access (WiMAX), enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., Compact Disk (CD), a Digital Video Disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. First network equipment, comprising:
   a processor; and
   a memory that stores executable instructions that, when executed by the processor, facilitate performance of operations, comprising:
      determining a composite view of data related to a user equipment based on a paging attempt being scheduled for the user equipment, wherein the paging attempt is configured to power up the user equipment from a sleep state, and wherein the data comprises a capability of the user equipment, a category of the user equipment, and a location of the user equipment; and
      based on the data, an update to a mapping function for the user equipment, and mobility management behaviors associated with previous paging messages transmitted to the user equipment, transmitting a page to the user equipment,
      wherein the mapping function is updated based on signaling interactions with respective network functions of second network equipment and third network equipment, wherein the page is the paging attempt scheduled for the user equipment, and wherein the user equipment is classified as an internet of things device.

2. The first network equipment of claim 1, wherein the page is a first page, wherein the paging attempt is a first paging attempt, and wherein the operations further comprise:
   transmitting a second page to the user equipment based on a first determination that a response from the first page was not received from the user equipment and based on a second determination that a paging policy authorizes a second paging attempt for the user equipment.

3. The first network equipment of claim 1, wherein the page is a first page, wherein the paging attempt is a first paging attempt, and wherein the transmitting comprises:
   evaluating an information element of a paging policy indicator flag, wherein the evaluating is based on a determination that the paging attempt scheduled for the user equipment is derived from a downlink data notification; and
   executing a paging for the downlink data notification based on implementation of a first policy that is based on the information element of the paging policy indicator flag being a first value, and a second policy that is based on the information element of the paging policy indicator flag being a second value.

4. The first network equipment of claim 1, wherein the transmitting comprises:
   executing a short message paging as a function of a mapping policy based on a determination that the paging attempt scheduled for the user equipment is derived from a short message service indicator.

5. The first network equipment of claim 1, wherein the paging attempt is a first paging attempt, and wherein the operations further comprise:
   transmitting a second page as a second paging attempt to the user equipment based on the data, the mobility management behaviors, and the update to the mapping function.

6. The first network equipment of claim 5, wherein the operations further comprise:
   associating the first paging attempt with a first targeted paging procedure and the second paging attempt with a second targeted paging procedure, different from the first targeted paging procedure.

7. The first network equipment of claim 1, wherein the transmitting comprises:
   accessing a paging policy and a context mapping table; and
   configuring the page for the user equipment based on the paging policy and the context mapping table.

8. The first network equipment of claim 1, wherein the data further comprises a radio network capability.

9. A method, comprising:
   determining, by first network equipment comprising a processor, a composite view of contextual data related to a user equipment based on a paging attempt being scheduled for the user equipment, wherein the contextual data comprises a capability of the user equipment, a category of the user equipment, and a location of the user equipment, and wherein the paging attempt is configured to increase a power consumption mode of the user equipment; and based on the contextual data, mobility management behaviors associated with previous paging messages transmitted to the user equipment, and an update to a mapping function for the user equipment, facilitating, by the first network equipment, a first transmission of a page to the user equipment, wherein the update to the mapping function is based on signaling interactions with respective network functions of second network equipment and third network equipment, wherein the page is the paging attempt scheduled for the user equipment, and wherein the user equipment is classified as an internet of things device.

10. The method of claim 9, wherein the page is a first page, wherein the paging attempt is a first paging attempt, and wherein the method further comprises:

facilitating, by the first network equipment, a second transmission of a second page to the user equipment based on a first determination that a response from the first page was not received from the user equipment and based on a second determination that a paging policy authorizes a second paging attempt for the user equipment.

11. The method of claim 9, wherein the page is a first page, wherein the paging attempt is a first paging attempt, and wherein facilitating the first transmission comprises:

evaluating an information element of a paging policy indicator flag, wherein the evaluating is based on a determination that the paging attempt scheduled for the user equipment is derived from a downlink data notification; and executing a paging for the downlink data notification based on implementation of a first policy that is based on the information element of the paging policy indicator flag being a first value, and a second policy that is based on the information element of the paging policy indicator flag being a second value.

12. The method of claim 9, wherein facilitating the first transmission comprises:

executing a short message paging as a function of a mapping policy based on a determination that the paging attempt scheduled for the user equipment is derived from a short message service indicator.

13. The method of claim 9, wherein facilitating the first transmission comprises:

accessing a paging policy and a context mapping table; and configuring the page for the user equipment based on the paging policy and the context mapping table.

14. The method of claim 9, wherein the page is a first page, wherein the paging attempt is a first paging attempt, and wherein the method further comprises:

facilitating, by the first network equipment, a second transmission of a second paging attempt to the user equipment based on the data, the mobility management behaviors, and the update to the mapping function.

15. The method of claim 14, further comprising:

associating, by the first network equipment, the first paging attempt with a first targeted paging procedure and the second paging attempt with a second targeted paging procedure, wherein the first targeted paging procedure and the second targeted paging procedure are different targeted paging procedures.

16. A non-transitory machine-readable medium, comprising executable instructions that, when executed by a processor of a user equipment, facilitate performance of operations, comprising:

evaluating a composite view of data of the user equipment and mobility management behaviors associated with past paging messages transmitted to the user equipment, wherein a paging attempt is scheduled to wake up the user equipment based on increasing a power consumption mode, and wherein the data comprises a capability of the user equipment, a category of the user equipment, and a location of the user equipment; and based on the data, a mapping function that is updated based on signaling interactions with respective network functions of second network equipment and third network equipment, and the mobility management behaviors, sending a page to the user equipment, wherein the page is in response to the paging attempt scheduled for the user equipment, and wherein the user equipment is classified as an internet of things device.

17. The non-transitory machine-readable medium of claim 16, wherein the page is a first page, wherein the paging attempt is a first paging attempt, and wherein the operations further comprise:

based on the data, the mobility management behaviors, and the mapping function, sending a second page as a second paging attempt to the user equipment.

18. The non-transitory machine-readable medium of claim 16, wherein the page is a first page, wherein the paging attempt is a first paging attempt, and wherein the operations further comprise:

sending a second page to the user equipment based on a first determination that a response from the first page was not received from the user equipment and based on a second determination that a paging policy authorizes a second paging attempt for the user equipment.

19. The non-transitory machine-readable medium of claim 18, wherein the operations further comprise:

associating the first paging attempt with a first targeted paging procedure and the second paging attempt with a second targeted paging procedure, different from the first targeted paging procedure.

20. The non-transitory machine-readable medium of claim 16, wherein the operations further comprise:

executing a short message paging as a function of a mapping policy based on a determination that the paging attempt scheduled for the user equipment is derived from a short message service indicator.

\* \* \* \* \*